UNITED STATES PATENT OFFICE.

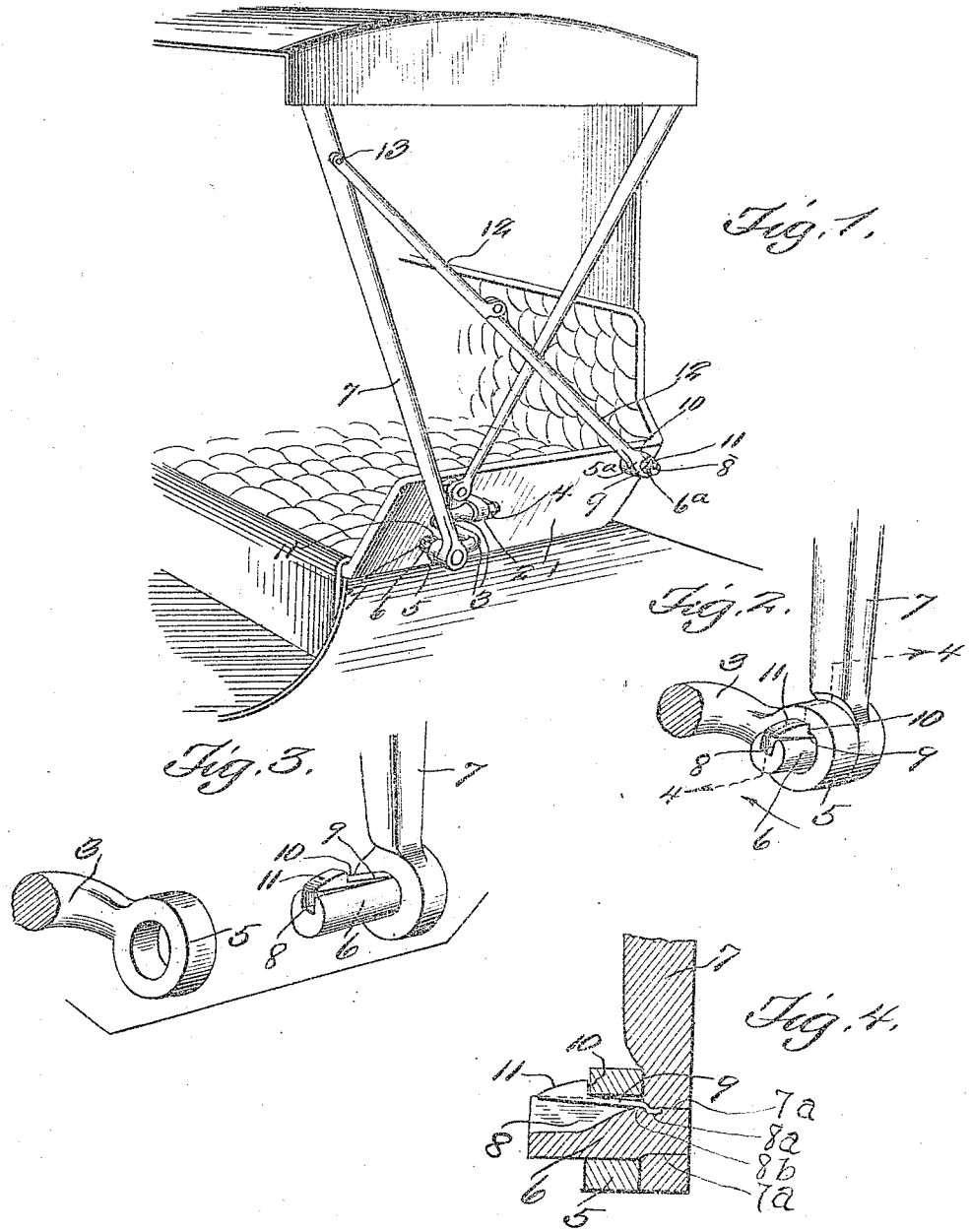

HENRY C. EGLESTON, OF TAMPA, FLORIDA.

VEHICLE TOP CONNECTION.

1,045,268.	Specification of Letters Patent.	Patented Nov. 26, 1912.

Application filed July 8, 1911. Serial No. 637,552.

*To all whom it may concern:*

Be it known that I, HENRY C. EGLESTON, a citizen of the United States, residing at Tampa, in the county of Hillsboro and State of Florida, have invented a new and useful Vehicle Top Connection; and I do hereby declare the following to be a full, clear, and exact description of the invention, such as will enable others skilled in the art to which it appertains to make and use the same.

This invention relates to automobile tops, and particularly to a new and useful device for detachably connecting the automobile top to the body of the vehicle.

One of the objects of the invention is to provide a simple, efficient and practicable connection of this nature, whereby automobile tops may be removed quickly and easily, and also attached with minimum amount of trouble.

The main object of the invention, however, is the provision of a replaceable lug for vehicle top bows comprising a pin adapted to be received in an aperture in the bow. It has been found that the usual pin is shrunk and riveted in an aperture of the vehicle top bow, and by filing the riveted end, the usual pin may be knocked out, and in its place a similar pin having a slot may be fixed in the aperture of the bow, and with it a spring pressed shouldered latch, which works in the slot so as to engage a shoulder on a bow top socket, whereby the vehicle top bow may be quickly and easily attached or detached to the side of the vehicle seat. If desired, however, the usual pin may be equipped with a slot containing a spring pressed shouldered latch.

The invention comprises further features and combination of parts as hereinafter set forth, shown in the drawings, and claimed.

In the drawings:—Figure 1 is a view in perspective, showing an automobile top and body having the improved connection applied and constructed in accordance with the invention. Fig. 2 is an enlarged view of the connection assembled. Fig. 3 is an enlarged perspective view of the connection, showing the parts disconnected. Fig. 4 is a sectional view on line 4—4 of Fig. 2.

Referring more especially to the drawings, 1 designates a portion of an automobile body, from which a stud 2 laterally projects. A bracket 3, angular in contour, is threaded into the stud and provided with a nut for securing the bracket in place. The bracket 3 is provided with an apertured member 5 to receive the laterally projecting lug 6 of one of the stays of the automobile top.

The lug 6 is provided with a longitudinal recess 8, adjacent to which a second recess $8^a$ adjoins, in which recess $8^a$ a spring member 9 is secured. A raised portion $8^b$ is provided between the recesses, for the spring member to act against. The lug is shrunk or closely fitted in the lower end of the stay 7, as shown at $7^a$. The end of the spring which is arranged in the recess $8^a$ is held in place by the wall of the opening $7^a$ of the stay. The free end of the spring member moves freely in the outer open end of the recess, and is provided with a shoulder 10, and from this shoulder a beveled or curved off portion 11 extends to the end of the spring member. This shoulder constitutes means for holding the apertured member on the lug 6. To connect the apertured member to the lug, the same is forced on the lug, thus pressing the spring member, that is, the free end portion thereof, down into the longitudinal recess of the lug, until the apertured member engages the stay 7, then the shouldered portion of the spring member will spring up in the path of the apertured member, which will prevent accidental displacement of the apertured member, with relation to the lug 6. To disconnect the apertured member, the spring member is depressed, after which the lug may be withdrawn from the apertured member. The stay 7 is provided with the usual toggle lever connections 12, and the other necessary connections, for holding the stay 7 and the automobile top in erect positions. The toggle lever connections are connected to the stay 7, as shown at 13.

From the foregoing it is evident that there has been devised a novel, simple, and efficient connection between automobile top stays and the body of the vehicle, and one which has been found to be practicable in every respect.

The invention having been set forth, what is claimed as new and useful is:—

1. In a device for connecting an automobile top detachably to the body of a vehicle, a bracket member secured to the body and provided with an apertured end, an automobile top stay having an opening at its lower end portion, a lug fitted closely in the opening of the stay and extending laterally therefrom and adapted to extend through the apertured end of the bracket member, the lug having an elongated recess in the laterally extending portion thereof and provided with an adjoining recess extending within the opening of the stay, the lug having a raised portion between the recesses, a spring leaf member having a shoulder and arranged at one end in the adjoining recess and adapted to act against the raised portion to hold the shoulder of the spring in engagement with the apertured end of the bracket, the opening of the stay constituting means for holding the spring in the adjoining recess.

2. A replaceable lug for vehicle top bows comprising a pin adapted to be received in an aperture in the bow and having a slot containing a spring pressed shouldered latch adapted to engage a shoulder on a bow top socket, said latch being held in said slot in said pin by the engagement of said pin in said aperture.

In testimony whereof I have signed my name to this specification in the presence of two subscribing witnesses.

HENRY C. EGLESTON.

Witnesses:
S. V. RAY,
D. F. CARLTON.